Patented Mar. 28, 1939

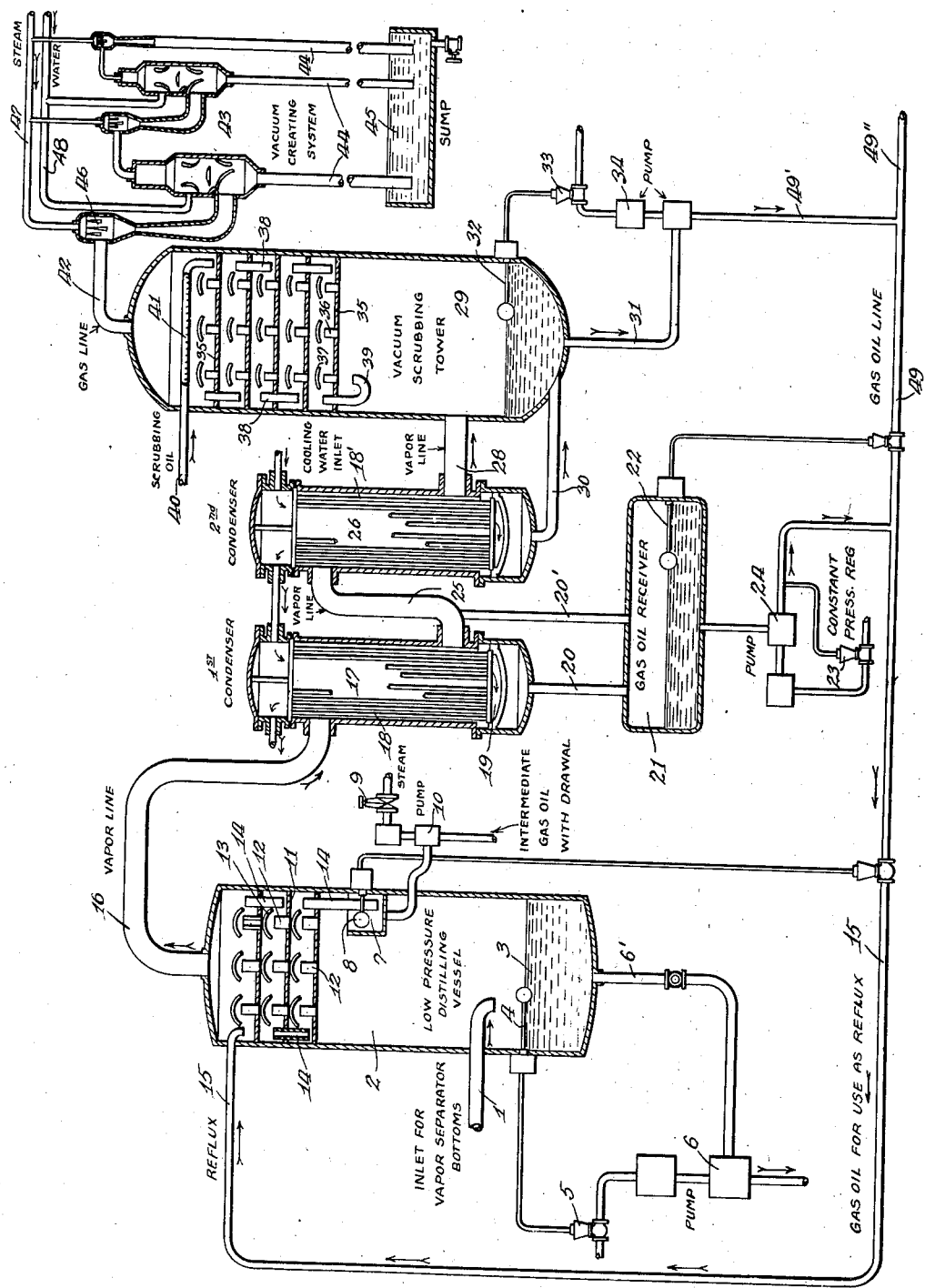

2,152,155

UNITED STATES PATENT OFFICE 2,152,155

METHOD OF PROTECTING VACUUM-CREATING EQUIPMENT OF DISTILLING PLANTS

Robert L. Rude, Toronto, Ontario, Canada, assignor, by mesne assignments, to The British American Oil Company, Limited, Toronto, Ontario, Canada, a corporation of Canada Application September 30, 1935, Serial No. 42,749

2 Claims. (Cl. 196—77)

The present invention relates to a method of protecting the vacuum-creating equipment used in the art of distillation, and particularly in connection with the low-pressure distillation of oils and other volatile organic products.

Broadly speaking, the invention concerns itself primarily with the solution of a problem which arises in connection with low-pressure or vacuum distillation of volatile materials such as oils, namely, in that the vacuum-creating equipment employed for creating and maintaining the desired low pressure within the apparatus causes the entrainment of vapors which, while uncondensable—or substantially so—under low-pressure conditions, are however condensable to liquid form at the relatively high pressures obtaining at normal atmospheric pressure, so that the thus condensed products will either foul the vacuum pumps—if they be used—or will condense in the barometric legs of barometric jet condensers, becoming emulsified with the water therein and rendering the latter unfit for discharge into streams and ponds. This difficulty is particularly to be found in connection with the condensing equipment employed in the mineral oil industry. Thus, for example, when distilling mineral oils under low pressure, commonly called "vacuum distillation" and so described hereinafter, the most volatile products are somewhat difficult to condense under the prevailing low pressure and, despite powerful cooling means, often remain entrained in vaporous condition in the effluent gaseously fluid products which pass to the vacuum-creating equipment. This difficulty is quite noticeable and presents in effect a major problem in the flash distillation of residua from the vapor separators of oil-cracking plants.

One of the major objects of the present invention therefore is to remove from the effluent gases of the condensing equipment of a flash distilling system such residual uncondensed volatile products as would have a tendency, when raised to atmospheric pressure, to condense to the liquid form. This is accomplished, in accordance with the present invention, by passing the effluent gases from the final condensing means through efficient scrubbing equipment wherein the said gases are passed countercurrent to a body or bodies of an absorbing medium in liquid form, this medium having sufficient low vapor tension to prevent it from itself becoming vaporized under the conditions existing in the system.

This may most advantageously be accomplished by the employment of a device constructed on the general order of a bubble tower, but the invention is not to be limited thereto, as efficient types of baffle towers and packing towers may be substituted with substantially equivalent results for the bubble tower shown in the specific embodiment of the present invention.

The removal of the residual uncondensed vapors by means of a liquid scrubbing medium through which the said gases are passed may advantageously be combined with a system for flash distilling the residua from the vapor separators of a cracking plant, although it is particularly pointed out that the system may with equally good results be employed in connection with vacuum distilling equipment in general, such for example as that used for the low-presure distillation of lubricating oils or lubricating-oil stocks.

It will furthermore be evident that the present invention is not necessarily limited to the distillation of oils but may also be used in connection with distillation equipment employed in the industrial arts, such as the manufacture of alcohol and various organic solvents, chlorinated hydrocarbons, higher alcohols, esters, and aromatic hydrocarbons and their substitution products. It may also be employed in connection with the low-pressure distillation of such organic materials as aniline, nitrobenzene, carbon tetrachloride, and the like.

As a specific embodiment of the present invention there will now be described the flash distillation operation that is used in connection with mineral-oil cracking plants.

For purposes of illustration, reference is directed to the herewith filed single sheet of drawings in which the essential features of the invention are diagrammatically illustrated. This drawing, it must be distinctly understood, is purely diagrammatic, and no attempt has been made to draw to scale the various portions of the equipment. Rather, the essential portions of the equipment are shown either enlarged or reduced, depending upon the amount of detail required to illustrate the various portions of the apparatus for a proper understanding of the functioning thereof. Suitable indicia on the drawing, coupled with reference numerals and explanatory markings, will render the system readily comprehended when taken in connection with the immediately following description thereof.

Referring to the drawing, it is to be understood that a suitable supply of hot residuum is withdrawn from a vapor separator of an oil-cracking plant. Such oil cracking equipment is well known and understood in the art of preparing motor fuel and hence does not require detailed description or to be shown in the drawing. It is therefore to be assumed, for the purpose of understanding the present invention, that through the pipe 1 there is conducted into the low-pressure distilling vessel 2 the heated residuum from the vapor separator of the cracking plant. Obviously, of course, pipe 1 might serve for the introduction of any other volatile material that it is desired to distill, in which case perhaps the low-pressure distilling vessel 2 might be provided with suitable heating means, which latter however are not shown in the drawing, being unnecessary for a proper understanding of this invention.

In the low-pressure distilling vessel 2 there is usually maintained, near the bottom thereof, a mass of liquid 3 undergoing distillation, its level being maintained by a level-maintaining float system broadly designated by the reference numeral 4 and connected by known means to the steam control 5 of a suitable discharge pump 6 which constantly pumps unvaporized residual material from the bottom of the low-pressure distilling vessel 2, discharging the same to any desired storage tank (not shown). Pump 6 is needed because there is maintained in the low-pressure distilling vessel a pressure lower than that of the atmosphere, so that it is necessary to pump the material out of the tank, although of course, if the tank were located high enough and the discharge pipe were more than 32 feet long and vertically disposed, liquid would run therefrom under the influence of gravity without adversely affecting the vacuum maintained in the distilling vessel.

At a point intermediate the top and bottom of this vessel 2 there is located an internal vessel 7 open at the top and likewise provided with a float level-maintaining device 8 connected with the steam control 10 of a discharge pump 10, this vessel 7 serving for the reception of material condensed on bubble trays 11 which are positioned in the upper part of the low-pressure distilling vessel 2. These bubble trays are of standard construction, consisting of vertical vapor riser pipes 12 surmounted by serrated bubble caps 13, that is, pipes 12 project through the decks 11. Each deck is connected with the deck immediately below it by the well known type of overflow pipes 14. While the drawing shows but three of these bubble decks, it is to be understood that there may be any desired number thereof, the three being shown merely for the purpose of illustration. Into the uppermost deck of the bubble trays 11 there is pumped during the operation of the equipment, through the line 15, suitable refluxing stock which may be in the nature of gas oil, preferably having a boiling point within the range of that of the material which it is desired to distill out of the residuum 3. The purpose of this gas-oil reflux return is to maintain at the top of the low-pressure distilling vessel the temperature which corresponds to about the end point of the material volatilized therein.

Vapors produced in the low-pressure distilling vessel 2 leave the same at the top thereof through the vapor line 16, being thence passed to the first condenser 17, entering the same near the top thereof. This condenser, as diagrammatically illustrated for the purpose of explaining the present invention, may consist of a vessel containing cooling coils 18 through which cooling water is passed, as shown in the drawing. The water enters at the top, flows down through one set of pipes, thence through a header 19, and then upward through the other set of pipes. The vapors cooled by the oil or water passing through the coils 18 partly condense to a liquid which is allowed to run by gravity through the pipe 20 and into the gas-oil receiver 21. The latter receiver 21 is also provided with a float level-maintaining device 22 which is connected with the control 23 of the pump 24 which serves to withdraw gas oil from the receiver 21. An enlarged vapor pipe 25 leads upwardly and enters a second condenser 26 at a point near the top thereof. This second condenser 26 is entirely similar in construction to condenser 17. As a result of encountering the cooling coil 18', further vapors will be condensed in the second condenser 26. There is a third vapor line 28 which leads into the vacuum scrubbing tower 29. There is also a pipe connection 30 between the bottom of the condenser 26 and the scrubbing tower 29, so that fluid may run from the condenser 26 to the scrubbing tower 29. In the bottom of the scrubbing tower 29 there is a discharge pipe 31, there also being a float level-maintaining device 32 connected with the steam control 33 of the pump 34. The pump 34 serves to pump material in liquid condition from the scrubbing tower 29. The material therein condensed is in the nature of a gas oil admixed with a heavy absorbing oil the origin of which will now be described.

The vacuum scrubbing tower 29 is preferably a bubble tower of the ordinary well known type consisting of a number of bubble decks 35 with the usual vapor riser pipes 36, serrated bubble caps 37, and downcomer pipes 38. The last downcomer pipe 39 is preferably in the form of a J, so that a liquid seal will always be maintained therein.

In the top of the vacuum scrubbing tower 29 there is continuously forced a scrubbing oil through the pipe 40, being distributed onto the uppermost deck 35 of the scrubbing tower 29 by means of pipe 41. The scrubbing oil is preferably of such a nature that its volatilization or the development of vapors therefrom under the conditions existing in the apparatus is substantially impossible.

At the top of the vacuum scrubbing tower there is a gas pipe 42 which leads directly to the vacuum-creating equipment, which in the present instance consists of a plurality of barometric jet condensers designated as a group by the reference numeral 43. These jet condensers are not illustrated in detail, as they are well known and standard equipment comprising barometric legs 44 and a sump 45, as well as injectors 46 and steam and water lines 47 and 48. The function of the barometric jet condensers is to create a vacuum in the entire apparatus. The barometric legs 44 are preferably longer than 32 feet and are usually about 40 feet in height so that, even though a vacuum is maintained in the system, no water can rise into the upper portions of the jet condensers. Obviously these jet condensers can, with equal success, be replaced by wet vacuum pumps or by using a dry vacuum pump and barometric legs, but without the injectors. All such equipment is quite well known in the art of distillation and hence requires no detailed description.

Because of the vacuum-creating system attached by the gas line 42 to the scrubbing tower 29 and because of the free and open communication between this tower and the condensers 26 and 17 and the low-pressure distilling vessel 2, a fairly low degree of pressure or vacuum will obtain in the entire system, this condition also existing in the gas-oil receiver 21 because of its connection with the condensers 17 and 26. In order to prevent any interference with the flow of liquid in the vapor line 25, a pressure equalizing pipe 20' is inserted between the lower bend of the pipe 25 and the gas-oil receiver 21.

The gas oil which is pumped by means of pump 24 from the gas-oil receiver 21 serves in part as the reflux medium which enters the top of the low-pressure distilling vessel through the line 15. The remainder of the gas oil may be led through the pipes 49, 49' and 49" either to storage or directly to the bubble tower which is employed in connection with the cracking plant, being fed into either the lowermost decks of this tower or into the accumulating storage space in the bottom of the tower, thus serving as part of the recycled gas oil which is passed to the cracking coil or system.

The operation and functioning of the system herein illustrated is substantially as follows: The heated residuum which enters the low-pressure distilling vessel 2 through the intake pipe 1 becomes partially converted into vapor as a result of the heat contained therein and the comparatively low pressure maintained above its level. The residuum will therefore separate into a very heavy final residuum which is removed from the low-pressure distilling vessel 2 by means of the pump 6 and the line 6', while the more volatile products will be converted into vaporized form and will rise through the riser pipes 12 of the bubble decks 11, bubbling through the liquid which eventually collects upon the plates 11. A certain amount of the heaviest constituents, usually known as intermediate gas oil, will condense on the bubble decks 11 and will collect in the collecting vessel 7 and be withdrawn therefrom by means of the pump 10. Uncondensed vapors will leave through the vapor line 16 and will be condensed in the condensers 17 and 26. The condensate collected in the first condenser 17 will pass to the gas-oil receiver 21, as already mentioned.

Vapors which remain uncondensed in condensers 17 and 26 are usually, because of the fall in temperature, so attenuated that under the low pressure existing in the equipment they are substantially uncondensable; and, were it not for the vacuum scrubbing tower 29, they would pass to the vacuum-creating system, eventually condensing therein for the reason that at the outlet of this system—that is, the other side of the sump 45 or any vacuum pumps that may be used—the residual vapors will condense because they are then in a higher pressure environment, namely that of atmospheric pressure. However, by virtue of the bubble decks 35 and bubbling equipment 36 and 37 that is found in the vacuum scrubbing tower 29, these still uncondensed but condensable vaporized products will be forced through the layers of liquid scrubbing oil which are maintained on the bubble decks 35 of the vacuum scrubbing tower 29.

Inasmuch as this scrubbing oil is sufficiently heavy to avoid becoming volatilized under the conditions obtaining in the scrubbing tower 29, the condensable but uncondensed vapors will be absorbed and condensed by this scrubbing oil and will be carried therewith in liquid form to the bottom of the vacuum scrubbing tower 29, being pumped therefrom through the pipe 31 and pump 34 to commingle with the gas oil stream which is flowing from the gas-oil receiver 21 and from the second condenser 26 through the line 30. The combined fluid thus flowing through lines 49' and 49" may then be directed to the cracking equipment of the plant (not shown). It is preferable, however, for the reflux returned through the line 15 to the low-pressure distilling vessel 2 only to use the gas-oil from the receiver 21 and not the mixed gas oil and scrubbing oil that flows through the line 49'.

It will be seen from the above description that the vacuum-creating equipment is, by means of the present invention, substantially completely protected against uncondensed but condensable vapors, so that the water discharged, as for example from the barometric jet condensers, will be pure and may be sent directly into a stream or pond or may be conducted to a spray pond where it may be sprayed into the atmosphere to be cooled and returned to the barometric jets. Thus there is not only eliminated an intolerable nuisance, such as the emulsion of oil and water which has hitherto formed in the barometric jet condenser legs, but there is condensed, entrapped and retained all volatile material which may have been contained in the residuum that is flash distilled in the distilling vessel 2. This cheapens the operation and renders it clean and easy to control.

The vacuum scrubbing tower 29 may be of any desired height or dimensions, depending entirely upon the nature of the material that is flash distilled in the apparatus. While the invention has been described in connection with the flash distillation of residua, it is not to be limited thereto but to be circumscribed only by the scope of the hereunto appended claims.

I claim:

1. In the flash distillation of hot residuum from a mineral oil cracking operation, the process which comprises flashing hot residuum into a zone maintained at a pressure substantially below atmospheric, passing the gases and vapors produced in said flashing step through a plurality of pools of absorbent oil to condense a portion of the vapors, condensing a further portion of vapors to produce an intermediate condensate, passing the still uncondensed highly volatile vapors and gases from the intermediate condensation step through a plurality of superposed pools of an absorbent oil maintained at a temperature at which it has substantially zero vapor pressure under the conditions obtaining in the apparatus, utilizing the solution of vapors in said absorbent oil produced in the last condensation step, as a part of the cracking stock, utilizing the intermediate condensate as the absorbent oil for the first named condensation step, and conducting the stripped residual gases to a steam jet type of vacuum-creating equipment to maintain the system under a vacuum.

2. A flash distilling system for hot residuum from an oil cracking plant, comprising, in combination, a flash chamber, means for introducing hot residuum from an oil cracking plant into said flash chamber, a scrubber associated with said flash chamber for scrubbing the vapors and gases produced in said flash chamber with a scrubbing oil, a condenser, means for passing the vapors and gases from said scrubber to said condenser, a bubble tower, means for conducting the vapors and gases from said condenser to said bubble tower, means for conducting the condensate from the condenser to the scrubber for use therein as a scrubbing medium, means for feeding oil into the upper decks of said bubble tower, means for conducting the oil from the lower part of said bubble tower to the cracking plant, and a barometric jet condenser connected with said bubble tower to maintain the entire system at a pressure substantially less than atmospheric.

ROBERT L. RUDE.